United States Patent
Kresse

(10) Patent No.: US 8,412,358 B2
(45) Date of Patent: Apr. 2, 2013

(54) METHOD AND DEVICE FOR TESTING DRIVE PARAMETERS OF AN ELECTROPNEUMATIC VALVE FOR A PNEUMATIC ACTUATING DRIVE

(75) Inventor: Heiko Kresse, Obernkirchen (DE)

(73) Assignee: ABB Technology AG, Zurich (CH)

( * ) Notice: Subject to any disclaimer, the term of this patent is extended or adjusted under 35 U.S.C. 154(b) by 135 days.

(21) Appl. No.: 12/687,600

(22) Filed: Jan. 14, 2010

(65) Prior Publication Data

US 2010/0181512 A1 Jul. 22, 2010

(30) Foreign Application Priority Data

Jan. 14, 2009 (DE) .......................... 10 2009 004 571

(51) Int. Cl.
*G05B 13/02* (2006.01)
(52) U.S. Cl. .............................. 700/39; 700/282; 322/15
(58) Field of Classification Search .................. 700/282, 700/39; 322/15
See application file for complete search history.

(56) References Cited

U.S. PATENT DOCUMENTS

| | | | |
|---|---|---|---|
| 3,866,109 A * | 2/1975 | Reed et al. ........................ | 322/15 |
| 5,742,161 A * | 4/1998 | Karte ........................ | 324/207.16 |
| 5,992,229 A | 11/1999 | Pyotsia et al. | |
| 6,094,602 A | 7/2000 | Schade, III | |
| 6,272,401 B1 | 8/2001 | Boger et al. | |
| 6,285,913 B1 | 9/2001 | Hagglund | |
| 6,286,532 B1 * | 9/2001 | van Nieuwstadt et al. ........ | 137/1 |
| 6,523,911 B1 * | 2/2003 | Rupp et al. ........................ | 303/7 |
| 6,589,039 B1 | 7/2003 | Doughty et al. | |
| 7,275,473 B2 | 10/2007 | Mohlmann | |
| 7,694,936 B2 | 4/2010 | Hoffmann et al. | |
| 2001/0037159 A1 | 11/2001 | Boger et al. | |
| 2004/0236472 A1 * | 11/2004 | Junk et al. ...................... | 700/282 |
| 2007/0045579 A1 | 3/2007 | Wirtl et al. | |
| 2008/0073912 A1 | 3/2008 | Fortmann et al. | |

FOREIGN PATENT DOCUMENTS

| | | |
|---|---|---|
| DE | 195 01 136 C2 | 7/1996 |
| DE | 196 45 210 A1 | 5/1998 |
| DE | 101 22 776 B4 | 12/2001 |

(Continued)

OTHER PUBLICATIONS

German Examination Report for DE 10 2009 004 571.6 dated Oct. 5, 2009.

(Continued)

*Primary Examiner* — Mohammad Ali
*Assistant Examiner* — Anthony Whittington
(74) *Attorney, Agent, or Firm* — Buchanan Ingersoll & Rooney PC

(57) ABSTRACT

A method and an electronic device are disclosed for testing drive parameters of an electropneumatic valve which is inserted into a closed control loop for position regulation of a switching element of a pneumatic actuating drive for a fitting which can be operated thereby. The electropneumatic valve can be driven by an alternating signal of a specific amplitude, such that the control loop will oscillate about a nominal position value to be regulated by alternate ventilation and venting of the valve, such that hysteresis present in the pneumatic actuating drive can be overcome. The trajectory of the position oscillation that is produced can, at the same time, be detected at the switching element using sensors, from which a characteristic of the control loop for the selected amplitude can be determined to confirm whether an opening point which is suitable for the control loop has been found.

17 Claims, 2 Drawing Sheets

FOREIGN PATENT DOCUMENTS

| | | | |
|---|---|---|---|
| DE | 101 42 040 | A1 | 6/2002 |
| DE | 10209545 | A1 | 10/2003 |
| DE | 10 2005 014097 | A1 | 4/2006 |
| DE | 10 2005 002387 | A1 | 7/2006 |
| EP | 1651485 | B1 | 11/2007 |

OTHER PUBLICATIONS

"Der kompakte, intelligente Stellungsregler" [The compact, intelligent position regulator] (ABB Automation Products GmbH, document No. 50/18-19 DE RevA: Jun. 2005 edition) (English language version also attached) (4 total pages).

German Office Action dated Jul. 21, 2009 issued in DE 10 2009 004 570.9-14.

German Office Action dated Jul. 22, 2009 issued in DE 10 2009 004 572.4-14.

German Office Action dated Nov. 24, 2009 issued in DE 10 2009 004 569.4-55.

\* cited by examiner

METHOD AND DEVICE FOR TESTING DRIVE PARAMETERS OF AN ELECTROPNEUMATIC VALVE FOR A PNEUMATIC ACTUATING DRIVE

RELATED APPLICATION

This application claims priority under 35 U.S.C. §119 to German Patent Application No. 10 2009 004 571.6 filed in Germany on Jan. 14, 2009, the entire content of which is hereby incorporated by reference in its entirety.

FIELD

The disclosure relates to determining drive parameters of an electropneumatic valve which can, for example, be inserted into a closed control loop for position regulation of the switching element of a pneumatic actuating drive for a fitting which can be operated thereby.

BACKGROUND INFORMATION

Pneumatic actuating drives are known which have a position regulator in order to regulate a desired opening level of a fitting, which is connected to the pneumatic actuating drive, on the basis of a nominal value preset. By way of example, the fitting may be a process valve within a pipeline system of a process installation. However, pneumatic actuating drives can also be suitable for operation of other industrial fittings.

The product prospectus "Der kompakte, intelligente Stellungsregler" [The compact, intelligent position regulator] (ABB Automation Products GmbH, document number: 50/18-19 DE RevA: June 2005 edition) discloses an electronic position regulator for a pneumatic actuating drive. The position regulator is formed as a type of electronics box which can be fitted to the pneumatic actuating drive. The position regulator is a configurable appliance which can communicate, for example, by a field bus. An exemplary functional aspect is a microprocessor-controlled procedure for a regulation program with a sampling rate of 20 ms. The nominal value can, in this case, be preset via a field bus connection which is designed using two-conductor technology.

Furthermore, the position regulator can have a supply air connection for an air pressure up to a maximum of 6 bar, as well as a working connection for passing on the control pressure generated by the position regulator to the control chamber of the pneumatic position regulator. A sensor input can be provided for an actual value of the present position of the switching element which is operated by the pneumatic actuating drive, which position is obtained via a position sensor arranged on the switching element. The pneumatic drive for the actuating drive can be provided continuously by an I/P module with a downstream 3/3-way valve. The 3/3-way valve controls the passage for ventilation or venting of the actuating drive as proportionally as possible. The configuration and observation of the operating state of the position regulator can be carried out either by a built-in control panel directly in situ, or centrally via a communication connection, on the basis of the bus protocol by a superordinate control unit.

US 2007/0045579 A1 discloses a pneumatic position regulator which is formed as an I/P module with a 3/3-way valve. The 3/3 switching function provides for switch positions of ventilation, closed position and venting of a working connection, which supplies control pressure for the connected pneumatic actuating drive. The electropneumatic valve with a 3/3 switching function can have two closure elements, which point in mutually opposite directions of the actuating movement and act with a same magnitude with respect to one another, each of which bound an internal control chamber, with a common control pressure connection being associated with the two control chambers. While one closure element can be used for ventilation of the working connection, the other closure element can be used for venting of the working connection. When neither of the two closure elements is operated, then the valve is in a closed position.

For position regulation, an electropneumatic valve such as this is intended to provide as proportional a response as possible for the electrical drive signal with respect to the pneumatic manipulated variable, with disturbance variables, which are caused inter alia by the forces on the switching element of the fitting and the hysteresis, reacting on the pneumatic side. Furthermore, influencing variables such as temperature fluctuations, pressure fluctuations and the like, can disturb an ideal proportionality ratio. In order to achieve a response which is as linear as possible, the regulation in some cases takes account of correction values determined using sensors. The results which can be achieved in this way are, however, not necessarily satisfactory. Another influencing factor is hysteresis of the valve mechanism. In order to achieve high regulation accuracy, it is desirable to gain knowledge relating to the amount by which the actuating signal should be varied to overcome the hysteresis, such that the switching element is moved in a desired manner.

SUMMARY

A method for testing drive parameters of an electropneumatic valve in a closed control loop for position regulation of a switching element of a pneumatic actuating drive for a fitting is disclosed, the method comprising: driving an electropneumatic valve by an alternating signal of a selected amplitude, such that the control loop is regulated to oscillate about a nominal position value by alternate ventilation and venting of the valve to address hysteresis in the pneumatic actuating drive; detecting a trajectory of a position oscillation which is produced at the switching element via sensors; and determining a characteristic of the control loop for the selected amplitude to confirm a desired opening point for the control loop.

An electronic device is also disclosed for testing of drive parameters of an electropneumatic valve, comprising: a position sensor for detecting a trajectory of position oscillation produced at a switching element of a electropneumatic valve; and a regulation unit for driving the electromagnetic valve by an alternating signal at a selected amplitude via alternate ventilation and venting of the valve to address hysteresis of a pneumatic actuating drive, and for determining a characteristic of the control loop for the selected amplitude to confirm a desired opening point for the control loop.

A computer device is also disclosed for storing a computer program to cause an electronic device to perform the steps of: driving an electropneumatic valve by an alternating signal of a selected amplitude, such that the control loop is regulated to oscillate about a nominal position value by alternate ventilation and venting of the valve to address hysteresis in the pneumatic actuating drive; detecting a trajectory of a position oscillation which is produced at the switching element via sensors; and determining a characteristic of the control loop for the selected amplitude to confirm a desired opening point for the control loop.

BRIEF DESCRIPTION OF THE DRAWINGS

Other features and advantages will be described in more detail in the following text together with the description of exemplary preferred embodiments of the disclosure, with reference to the figures, in which.

DETAILED DESCRIPTION

Figure 1:
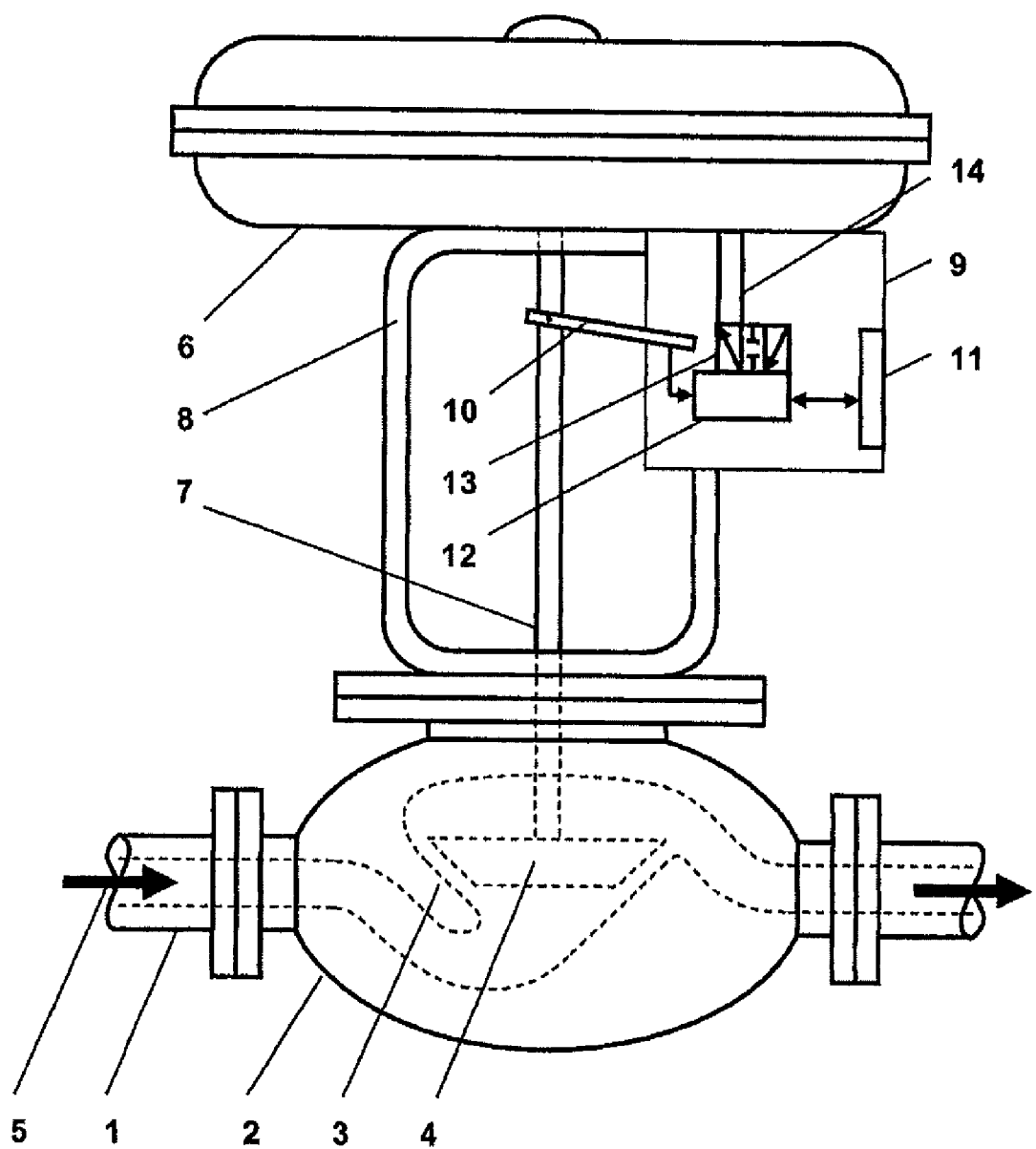
FIG. 1 shows a schematic side view of an exemplary pneumatic actuating drive of a fitting.

According to exemplary embodiments, a regulation characteristic of a valve, for example, with respect to hysteresis, can be analyzed to ensure regulation of high quality that is, for example, as linear as possible.

In an exemplary method disclosed herein, an electropneumatic valve of a pneumatic actuating drive is driven by an alternating signal such that the control loop is caused to oscillate about a nominal position value at which the valve is to be regulated by alternate ventilation and venting of the valve, such that hysteresis present in the pneumatic actuating drive can be addressed (e.g., overcome). A trajectory of a position oscillation which is produced can, at the same time, be detected at the switching element using sensors, from which the regulation characteristic can be defined to, for example, determine an opening point of the position regulation.

An exemplary advantage can thereby be achieved whereby a regulation characteristic can be analyzed during operation of the position regulation to identify variables which are currently influencing the regulation, and which can then be compensated for by control engineering. For example, the regulation can identify which opening point can be used for operation. For example, it is possible to evaluate the time interval between the electrical drive and the reaction of the switching element, as well as a gradient of the reaction, as characteristics of a regulation characteristic which are characteristic of prevailing hysteresis characteristics. The trajectory of the position oscillation which is produced at the switching element can be recorded along a time axis, and form a basis for analysis. The extent to which the electrical drive signal may need to be varied to bring about a desired change in the cross section of the fitting which is operated by the pneumatic actuating drive can thereby be identified. Regulation of the pneumatic actuating drive can be independently matched to the fitting which is being driven, as a result of which there is no need for manual configuration and initialization for this purpose.

To improve measurement accuracy, a mean value can be formed over a plurality of recorded oscillation periods of the switching element, which are detected by the position sensor. To eliminate corruption in the course of stabilizating the system, the measurement result of the first oscillation can be ignored (i.e., discarded) when forming the mean value. Formation of the mean value can reduce randomly occurring errors which can corrupt the measured value.

The drive parameters for ventilation and venting of the valve can be predetermined separately to produce the position oscillation of the switching element. As such, it is safe to pass through the hysteresis of the pneumatic actuating drive, and the trajectory of the excitation value can be recorded in a minimum possible time. The measurement time can, for example, advantageously shortened in this way.

The position point of the switching element at which the switching element cannot approach more slowly than a defined maximum permissible time, but not more quickly than a defined minimum permissible time, can be defined as an opening point for the position regulation. In this case, the maximum permissible time corresponds to the regulation speed, and the minimum permissible time represents its accuracy.

The time to overcome hysteresis of the pneumatic actuating drive for a predetermined drive level can be measured for the position oscillation of the switching element. The measured time value can be considered to represent a major characteristic variable of the regulation characteristic. The time to overcome the hysteresis can correspond, for example, to a time duration of remaining in one place to starting of the switching element, and its consideration from the control engineering point of view can be an important factor to allow an actual opening cross section of the fitting to be adjusted linearly and with high control quality.

An exemplary method as disclosed herein can be implemented in the form of a computer program product and/or computer readable medium which includes a software and/or firmware routine for determining the regulation characteristic, and/or which includes appropriate control commands stored in software to be carried out within an electronic regulation unit. For this purpose, the electronic regulation unit can have at least one microprocessor with a memory unit for storing the software, and at least the parameters which influence the process. The electronic regulation unit, which is a component of the closed control loop of the pneumatic actuating drive, can, for example, be fitted directly to the pneumatic actuating drive, in order to operate a fitting coupled thereto, in an electronic device as a position regulator.

An exemplary embodiment as disclosed herein is shown in FIG. 1 as including a fitting 2 in the form of a process valve with a seat structure installed in a pipeline 1 of a process installation. In its interior, the fitting 2 has a closing body 4, which can interact with a valve seat 3, in order to control the amount of process medium 5 passing through. The closing body 4 can, for example, be operated linearly, as a pushrod, by a pneumatic actuating drive 6 via a switching element 7.

The pneumatic actuating drive 6 is connected to the fitting 2 via a yoke 8. A position regulator 9 in the form of an electronics module can also be fitted to the yoke 8.

The travel of the switching element 7 can be signaled to the position regulator 9 by means of a position sensor 10. The detected travel can be compared with a nominal value, which is supplied from the exterior and is stored in a memory unit 11, by means of a regulation unit 12, and the actuating drive 6 can be driven as a function of the determined control error. The regulation unit 12 of the position regulator 9 can have an electropneumatic valve 13 as an UP converter for conversion of an electrical control error to an adequate control pressure. The electropneumatic valve 13 of the regulation unit 12 can be connected to the actuating drive 6 via pressure medium supply 14. An internal switching membrane, which cannot be seen in any more detail here but which operates the switching element 7, within the actuating drive 6 can be acted on by the control pressure which is supplied via the pressure medium supply 19.

In order to allow the regulation unit 12 to take account of the regulation characteristic, which is characterized by, for example, the hysteresis of the pneumatic actuating drive 6, and in order to achieve a high control quality, this regulation characteristic can be measured for initialization. For this purpose, the electropneumatic valve 13 can be driven by the regulation unit 12 with an alternating signal, such that the control loop oscillates by, for example, 50% about a position nominal value to be regulated at, by alternating the ventilation and venting of the valve 13. In each case, the oscillation can be of a magnitude to, for example, ensure that the hysteresis which is present in the pneumatic actuating drive 6 is overcome in the process. At the same time, the position sensor 10 can measure the trajectory of the position oscillation which is produced at the switching element 7. The oscillation recorded in this way can be supplied to the input side of the regulation unit 12, which evaluates the regulation characteristic which actually occurs for the pneumatic actuating drive 6 in order in particular to test the selected opening points of the position regulation for ventilation and venting. To this extent, the electropneumatic valve 13 can have a 3/3 switching function, with the switch positions ventilation, closed position and venting.

Figure 2:
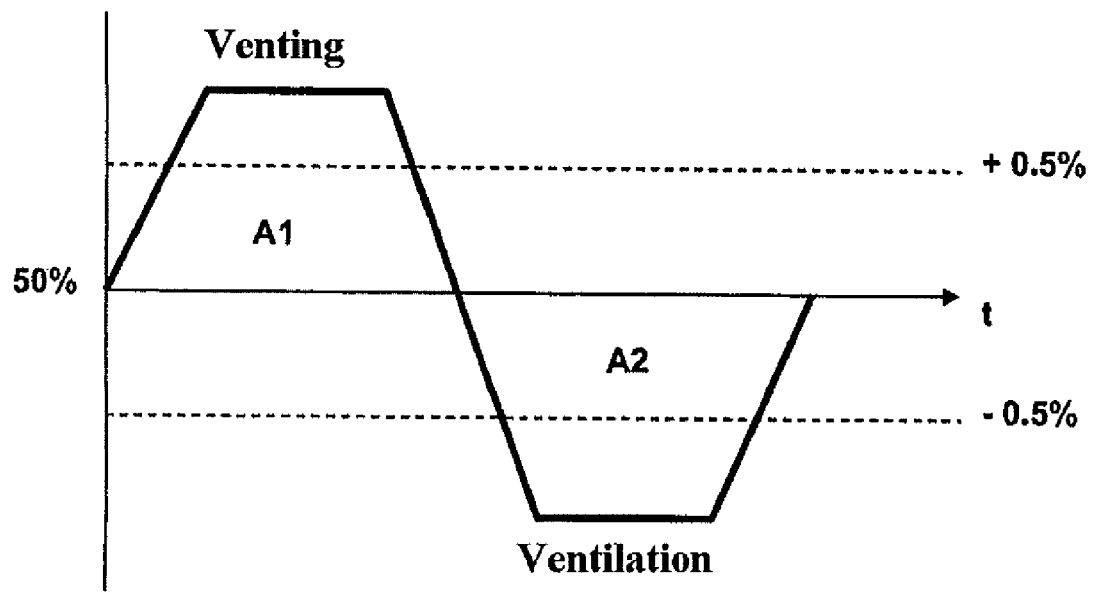
FIG. 2 shows a graph of an trajectory of position oscillation produced at a switching element, measured by a position sensor of a pneumatic actuating drive.

FIG. 2 shows an exemplary trajectory of the position oscillation which is produced at the switching element. In this case, the switching element can, for example, be kept at the 50% open position, and the switching element can be caused to oscillate about this position by an alternating signal, as a result of which the position sensor measures the illustrated trajectory at the switching element. The time profile between a short venting phase and a short ventilation phase following this is accordingly illustrated.

While the upper area A1 corresponds to the venting phase, the lower area A2 corresponds to the ventilation phase of the valve. The actuating element is caused to undergo an oscillatory movement such as this in this way, such that this exceeds the range of the switching hysteresis by +/−0.5%, in this exemplary case. At the same time, the trajectory of the position oscillation which is produced at the switching element can be detected using sensors via the position sensor of the pneumatic actuating drive, from which the regulation characteristic is defined, for example, to determine the correct opening point of the position regulation. In order to obtain an accurate evaluation result, a plurality of recorded oscillation periods can be taken into account, with the exception of the first oscillation period, which is disturbed by the stabilization of the system, with a mean value being formed from this.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Fitting
3 Valve seat
4 Closing body
5 Process medium
6 Pneumatic actuating drive
7 Switching element
8 Yoke
9 Position regulator
10 Position sensor
11 Memory unit
12 Regulation unit
13 Valve
14 Pressure medium supply

What is claimed is:
1. A method for testing drive parameters of an electropneumatic valve in a closed control loop for position regulation of a switching element of a pneumatic actuating drive for a fitting, the method comprising:
driving an electropneumatic valve by an alternating signal of a selected amplitude, such that the control loop is regulated to oscillate about a nominal position value by alternate ventilation and venting of the valve to address hysteresis in the pneumatic actuating drive;
detecting a trajectory of a position oscillation which is produced at the switching element via sensors; and
determining a characteristic of the control loop for the selected amplitude to confirm a desired opening point for the control loop.

2. The method as claimed in claim 1, comprising:
forming a mean value over a plurality of recorded oscillation periods of the switching element.

3. The method as claimed in claim 2, comprising:
ignoring a result of a first oscillation when forming the mean value.

4. The method as claimed in claim 1, comprising:
separately determining drive parameters for ventilation and venting of the valve to produce the position oscillation.

5. The method as claimed in claim 1, comprising:
defining a position point at which the switching element cannot approach more slowly than a defined maximum permissible time, but not more quickly than a defined minimum permissible time, as the desired opening point for the position regulation.

6. The method as claimed in claim 1, comprising:
measuring a time to overcome the hysteresis of the pneumatic actuating drive at a predetermined drive level for the position oscillation of the switching element.

7. The device as claimed in claim 1, wherein the electropneumatic valve comprises:
a 3/3 switching function for switch positions of ventilation, closed position and venting.

8. A computer readable medium for storing a computer program to cause an electronic device to perform the steps of:
driving an electropneumatic valve by an alternating signal of a selected amplitude, such that the control loop is regulated to oscillate about a nominal position value by alternate ventilation and venting of the valve to address hysteresis in the pneumatic actuating drive;
detecting a trajectory of a position oscillation which is produced at the switching element via sensors; and
determining a characteristic of the control loop for the selected amplitude to confirm a desired opening point for the control loop.

9. The computer readable medium as claimed in claim 8, wherein a routine for determining the regulation characteristic is implemented by appropriate control commands stored in software.

10. The method as claimed in claim 1, comprising:
supplying the detected trajectory of the position oscillation to an input side of a regulation unit, which determines the characteristic of the control loop.

11. The method as claimed in claim 10, wherein determining the characteristic of the control loop comprises:
evaluating a time interval between driving the electromagnetic valve and the detected trajectory of the position oscillation.

12. The method as claimed in claim 1, wherein detecting the trajectory of the position oscillation identifies a reaction of the switching element.

13. The method as claimed in claim 1, comprising:
varying the selected amplitude of the alternating signal based on the determined characteristic.

14. The computer readable medium as claimed in claim 8, wherein the method preformed by the electronic device comprises:

supplying the detected trajectory of the position oscillation to an input side of a regulation unit, which determines the characteristic of the control loop.

15. The computer readable medium as claimed in claim 8, wherein determining the characteristic of the control loop comprises:

evaluating a time interval between driving the electromagnetic valve and the detected trajectory of the position oscillation.

16. The method as claimed in claim 1, wherein the method preformed by the electronic device comprises:

detecting the trajectory of the position oscillation identifies a reaction of the switching element.

17. The method as claimed in claim 1, wherein the method performed by the electronic device comprises:

varying the selected amplitude of the alternating signal based on the determined characteristic.

* * * * *